Jan. 10, 1933.  H. H. SPRAGUE  1,893,601
GAS METER
Filed June 30, 1931  2 Sheets-Sheet 1

INVENTOR
Henry H. Sprague.
BY
Geo. W. Phillips  ATTORNEY

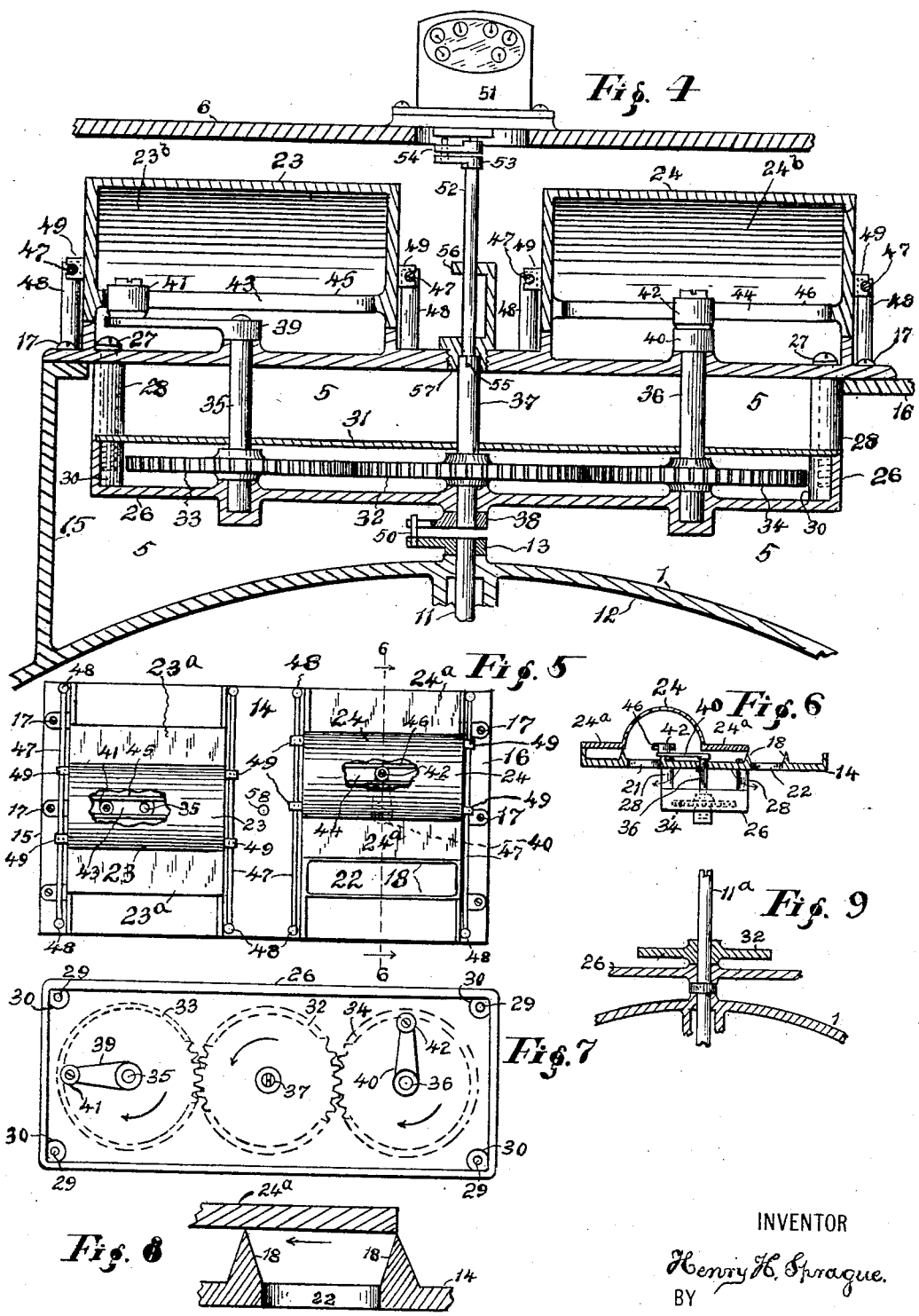

Patented Jan. 10, 1933

1,893,601

UNITED STATES PATENT OFFICE

HENRY H. SPRAGUE, OF BRIDGEPORT, CONNECTICUT, ASSIGNOR TO THE SPRAGUE METER COMPANY, OF BRIDGEPORT, CONNECTICUT

GAS METER

Application filed June 30, 1931. Serial No. 547,856.

My invention relates to gas meters, and particularly to that type of meters having movable diaphragms and a centrally located diaphragm driven crank shaft. It has been customary in this type of meters to actuate the valves from the crank shaft through the medium of a complicated system of pivotally supported levers and links, all subject to wear producing more or less lost motion, and which not only reduces the power efficiency and accuracy of the meter, but the size of the meter body must be unduly increased in order to provide an extra space for the location of these levers and links.

It is practically impossible for the valve link connections to cause the valves to oscillate an equal distance back and forth from the center between the valve seat ports without disturbing that close relation between the lap and lead of the valves which it is necessary to preserve in order to obtain the best results.

My improvement consists in transmitting motion from the conventional diaphragm driven crank shaft through a system of gears and valve actuating crank shafts, so that the valves will oscillate an equal distance between the valve ports. As the driving thrust of the gears is always in one direction, all lost motion that would otherwise interfere with the equal travel of the valves is entirely obliterated. This valve gear drive will not only greatly reduce the size of the meter body, but will also permit of the use of approximately knife edged valve seat partitions and thus effect an instantaneous opening and closing of the valve ports and practically obliterate the long valve lap required in link operated valves.

In describing the invention in detail, reference will be had to the acompanying drawings wherein like characters of reference denote corresponding parts in the several views in which, Figure 1 represents a partially broken side elevation of a conventional gas meter and its gas inlet and outlet ports—

Figure 4 is an enlarged broken sectional view of the meter body, gas distributing chamber cover, sectional view of the valves, valve seats and their base, gear box and its cover, and broken view of the diaphragm driven crank shaft—

Figure 5 is an enlarged broken view of the valves, showing one valve uncovering a port and the other valve closing both ports—

Figure 6 is a central sectional view on line 6—6 of Figure 5—

Figure 7 is an enlarged detached plan view of the gear box with its cover removed—

Figure 8 is an enlarged broken sectional view of the valve seat base, sectional view of the knife edge valve seats and a broken sectional view of the foot of one of the valves mounted on two of the seats, and Figure 9 is a modified construction of the central crank shaft, broken sectional view of the base of the gear box and meter body.

My invention relates to a conventional type of gas meters similar to the one shown in my former patent of August 28, 1917, No. 1,238,453, wherein the valves are oscillated through the medium of a diaphragm driven crank shaft. The improved features, associated with this type of meters are located in the gas distributing and gas exhaust chambers, a detail description of which will be fully set forth in the following specification.

Figure 1:
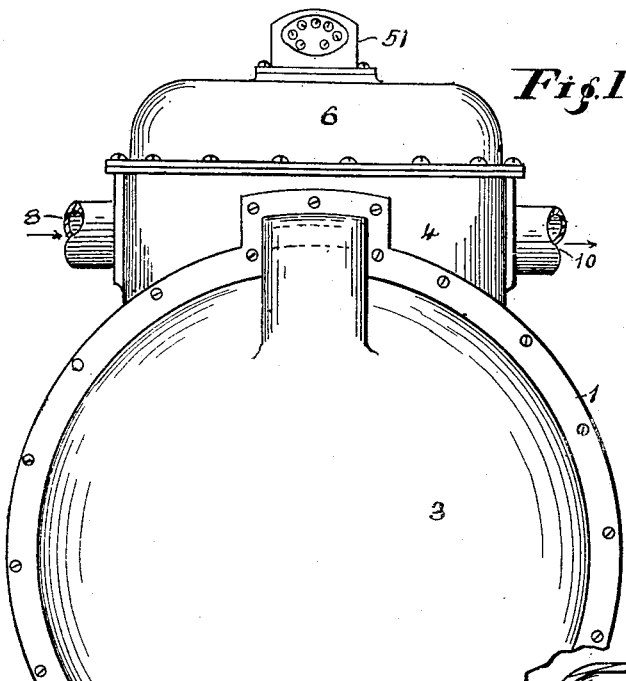
Figure 2:
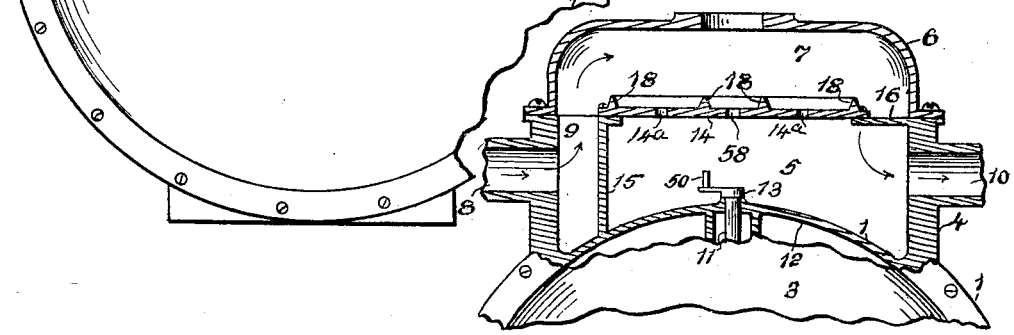
Figure 2 is a broken view of the meter body, and a central sectional view of the distributing and exhaust chambers—

1 represents the conventional meter body having the side covers 2, 3, housing 4 to form the gas exhaust chamber 5, and the cover 6 to form the gas distributing chamber 7, shown in Figure 2. 8, Figure 2, is the usual gas intake port opening into the port 9 and from thence into the gas distributing chamber 7, while the gas outlet port 10 leads out from the exhaust chamber 5.

The convention crank shaft 11 is rotatably connected to movable diaphragms mechanism, not shown, located in the bore 12 of the meter body and projecting therefrom with the crank 13 into the exhaust chamber 5.

Figure 3:
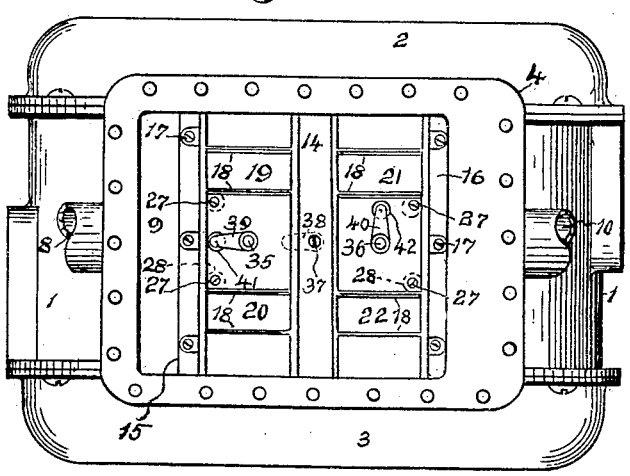
Figure 3 is an upper plan view of the meter with the cover of the gas distributing chamber removed—

The valve seat base 14, Figures 2 and 3, is secured to the cross rib 15 and the web 16 by the screws 17. 18 are the knife edged valve seats integral with the base 14, and 19, 20, 21, and 22, Figure 3, are the usual gas ports, and 23, 24, are the valves having the feet 23ᵃ and 24ᵃ, shown in Figure 5.

The valve gear drive and its mechanical elements comprise the box-like structure 26, Figures 3, 4 and 7, suspended from the valve seat base 14 and is located within the gas exhaust chamber 5 by means of the four corner screws 27, Figure 3. To simplify the construction, the four tubular filling pieces 28, Figures 3 and 4, are located between the valve seat base 14 and the box 26 to form a skeleton support for the latter and through which pieces the screws 27 pass with their threaded ends anchored in the threaded holes 29 in the corner fillets 30, Figure 7, at the bottom of the box 26. The pieces 28, Figure 4, also serve to maintain the cover 31 of the box 26 in place.

The gear 32 and the auxiliary gears 33, 34, are located within the box 26 and are mounted respectively on the short shaft section 37 and crank shafts 35, 36. This short section is aligned with the main driving shaft 11 and is practically an extension of the same, and is inserted as a matter of convenience in assembling the valve gear driving mechanism.

The shaft section 37 is journaled in the bottom of the box 26 at its inner end in operative engagement with the crank 13 of the shaft 11. The crank shafts 35, 36, are journaled in the bottom of the box 26 and also in the openings 14ᵃ, Figure 2, of the valve seat base 14. Each of the valves 23, 24, is independently reciprocated on its seat through the medium of the crank shafts 35, 36, and their crank arms 39, 40, carrying the rolls 41, 42, operatively mounted in the elongated transverse slots 43, 44, see also Figure 5, formed in the cross bars 45, 46, integral with the interior of the valves 23, 24.

Any suitable means may be used for guiding the valves on their seats. The means shown, Figures 4 and 5, comprise the side rods 47 supported in the uprights 48 with the forked extensions 49 of the valves in guiding contact with the side rods 47.

When the valves are operated by means of a more or less complicated system of levers and links, it is necessary to extend the gas distributing and exhaust chambers and the width of the meter body to provide the necessary room for the valves and their actuating mechanism to operate. With such an arrangement the valves must necessarily operate far to one side of the center of the body of the meter and at right angles to its bore. The initial freedom required in the various joints of the link and lever valve driving system together with the wear incidental thereto, must cause more or less lost motion and an irregular movement of the valves and gas delivery.

With the herein described valve gear driving system, none of the objectionable features of the link and lever system can possibly occur. The valves and their actuating mechanism are so closely grouped about the central crank shaft 11 that the valves move in a path parallel with the longitudinal axis of the bore of the body of the meter. In other words, at right angles to the valve link driving movement.

As before mentioned, the driving thrust of the gears being always in one direction, all lost motion throughout the valve gear driving system is entirely obliterated. The throw of the cranks will cause the valves to oscillate an equal distance between the valve ports and thus practically obliterate the usual lap of the valve seats required where the valves must have a more or less irregular oscillation under the valve lever and link actuating system.

It will be noted, Figure 8, that the end of the valve foot 24ᵃ rests on the knife edge of the seat 18 so that the slightest lead of the valve in the direction of the arrow will instantaneously uncover the port 22 for a continuous flow of gas and thus maintain a constant and uniform pressure.

While the crank shaft 11ᵃ, Figure 9, could be made of one piece, it would not be as conveniently assembled and disassembled as its connection with the diaphragm mechanism must be made inside of the meter body. Removing the cover 6, Figure 4, and the screws 17 the gear box 26 and its entire mechanism associated therewith can be bodily removed. The free connection between the driving pin 50 of the crank 13 and the crank 38 carried by section shaft 37 is such that the two cranks can be readily engaged or disengaged. As before mentioned, the short shaft section 37 must be in direct alignment with the shaft 11, this short section may be considered, for all intents and purposes, an integral part of the longer shaft section.

As the gear box and crank shafts connected with the gears are located in the exhaust chamber, and are entirely surrounded by gas, it is necessary to fill the box 26 with oil to lubricate its interior mechanism. It will be understood that the interior space 23ᵇ—24ᵇ of the valves constitutes a part of the gas exhaust area, so that the valve operating crank shafts are, strictly speaking, within the exhaust chamber.

Simple means for driving the index mechanism, not shown, in the housing 51, Figure 4, and located in direct alignment with the shaft section 37, comprise the shaft 52 carrying at its outer end the crank 53 in operative engagement with the crank 54 of the index registering mechanism.

The inner end of the shaft 52 has the tongue 55 detachably connected with the outer forked end of the shaft section 37. The bracket 56, in which the shafts 37, 52, are journaled and guided, has the threaded extension 57 adapted to register with the threaded hole 58, Figure 5, in the valve seat base 14.

Minor detail changes in the construction and arrangement of the various elements incidental to the valve gear driving feature can readily be made without departing from the spirit of my invention, which resides primarily in actuating the meter valves by means of a system of gearing and crank shafts connected therewith located in the gas exhaust chamber and operatively connected with the conventional crank shaft of the meter body.

Having thus described my invention what I claim is:—

1. In a gas meter of the character described having a body and gas distributing and gas exhaust chambers, means separating said chambers and including valve seats, valves for the seats, and a rotatable shaft projecting into said exhaust chamber from the meter body, a shaft section operatively connected with the body shaft, a gear mounted on the shaft section, auxiliary gears meshing with said first mentioned gear, a crank shaft carried by each of said auxiliary gears, each crank shaft operatively connected with a valve and independently oscillating the valves on their respective seats, and supporting means for locating the gears shaft section and valve operating crank shafts in the exhaust chamber of the meter.

2. In a gas meter having a driving shaft, gas distributing and gas exhaust chambers, and a valve seat base separating said chambers and having ports and valve seats, valves mounted on the seats, a shaft section aligned with said driving shaft and operatively connected therewith, a receptacle in which said shaft section is journaled, a gear mounted on the shaft section, auxiliary gears in operative engagement with said first mentioned gear, a crank shaft carried by each auxiliary gear and journaled in said receptacle and the valve seat base, each crank shaft having a driving arm in operative engagement with a valve and supporting means for locating said receptacle in which are mounted the gears, crank shafts and shaft section within the exhaust chamber of the meter.

3. In a gas meter having gas distributing and gas exhaust chambers and a valve seat base separating said chambers, said base having valve seats and gas ports, valves mounted on said seats, a driving shaft section, a receptacle in which said shaft section is journaled, a gear mounted on said shaft section, auxiliary gears meshing with the said driving shaft section gear, a crank shaft for each auxiliary gear and journaled in said receptacle, each crank shaft having an arm in operative engagement with a valve, and means for supporting the receptacle in which are mounted the gears, crank shafts and shaft section below the valve seat and in the exhaust chamber to permit of a free circulation of gas about the gear and crank shaft receptacle.

In testimony whereof I affix my signature.

HENRY H. SPRAGUE.